United States Patent
Niwa

(10) Patent No.: US 6,590,875 B1
(45) Date of Patent: Jul. 8, 2003

(54) RADIO DATA COMMUNICATION TECHNIQUE FOR MAINTAINING A CONNECTION BETWEEN A MOBILE RADIO TRANSMISSION DEVICE AND A SERVER DURING A COMMUNICATION INTERRUPTION

(75) Inventor: Yushi Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/473,014

(22) Filed: Dec. 28, 1999

(30) Foreign Application Priority Data

Dec. 28, 1998 (JP) .......................................... 10-374508

(51) Int. Cl.⁷ ................................................. H04B 1/60
(52) U.S. Cl. ......................... 370/328; 370/332; 455/10; 455/517
(58) Field of Search .......................... 455/517, 10, 63, 455/67.1, 504, 67.3, 506; 370/332, 328

(56) References Cited

U.S. PATENT DOCUMENTS 5,794,155 A * 8/1998 Andresen et al. ........... 342/358
5,926,767 A * 7/1999 Olds et al. .................... 455/10

FOREIGN PATENT DOCUMENTS

| JP | 5-83260 | 4/1993 |
|----|---------|--------|
| JP | 9-200844 | 7/1997 |
| JP | 10-23071 | 1/1998 |
| JP | 11-234191 | 8/1999 |

* cited by examiner

Primary Examiner—Edward F. Urban
Assistant Examiner—S. Smith
(74) Attorney, Agent, or Firm—Foley & Lardner

(57) ABSTRACT

In data communication utilizing a radio transmission channel, even in a case where the radio channel is disconnected and a data communication blackout occurs, the center side continues data communication processing, by obtaining information on a period where the data communication is interrupted in advance. The system comprises an application server provided in the center, a radio data communication terminal that performs data communication while moving, a mobile gateway provided in the center as a relay device between the application server and the radio data communication terminal, and a period notification device that transmits period information T at predetermined periods. The radio communication channel is disconnected by the period information transmitted from the period notification device, and the mobile gateway performs communication processing during the radio communication disconnection.

20 Claims, 9 Drawing Sheets

RADIO DATA COMMUNICATION TECHNIQUE FOR MAINTAINING A CONNECTION BETWEEN A MOBILE RADIO TRANSMISSION DEVICE AND A SERVER DURING A COMMUNICATION INTERRUPTION

REFERENCE TO RELATED APPLICATIONS

The present invention claims priority from Japanese Patent Application No. 10-374508 filed Dec. 28, 1998, the contents of which are incorporated herein by reference.

BACKGROUND OF THE INVENTION

1. Field of the Invention

The present invention relates to a radio data communication system in which in data communication utilizing a radio transmission channel, data communication processing on the center side can be continued even if a radio channel is disconnected and data communication is interrupted, by obtaining information on a period where data communication is interrupted, and more particularly, to a radio data communication system in a transportation system such as subway, i.e., a radio data communication system in which a radio communication terminal moves to a radio data communicable section (station or the like) and a radio data incommunicable section (tunnel or the like) alternately, and a period to pass through the radio data incommunicable section can be predicted with a certain level of precision.

2. Description of Related Art

A conventional radio data communication method will be described with reference to FIG. 2. In FIG. 2, a mobile gateway 202 stores the content of data communication with an application server 201 without changing the communication speed. A network 203 uses an existing radio communication network (e.g. PIAFS: PHS Internet Access Forum Standard). Data communication is performed by using a predetermined communication procedure between the application server 201 and a radio communication terminal 204.

The conventional mobile gateway 202 stores data communication content without consideration of communication speed with the application server 201. The mobile gateway 202 has a function to store the content of data communication when communication with the radio communication terminal 204 is interrupted, and when the communication with the radio communication terminal 204 is restarted, simply transmit the stored content of data communication to the radio communication terminal 204. This prevents duplexing of communication procedure (repeating communication from the start between application server and terminal) due to disconnection of communication with the radio communication terminal 204.

However, the conventional radio data communication system has following problems.

A first problem is that in a case where the radio communication terminal 204 becomes incommunicable in some period, the mobile gateway 202, which is not informed of the incommunicable period, cannot change the speed of communication with the application server 201.

A second problem is that in a case where the radio communication terminal 204 becomes incommunicable in some period, as the mobile gateway 202 stores the content of communication from the application server 201 without changing the communication speed, if a predetermined period for each application program has elapsed, the application server 201 cannot continue the sequence of communication.

In a radio data communication system having the conventional mobile gateway 202 with the first and second problems, the transmission efficiency is degraded and the application server 201 is overloaded in the following case. As shown in FIG. 12, radio data communication may include an incommunicable section when a radio communication terminal 1207 passes through a tunnel. The time for the terminal to pass through the incommunicable section is an incommunicable period. Conventionally, this incommunicable period is not known on the center side, and the application server suspends communication by using a timer unique to the application program, and enters communication non-restorable status. Accordingly, when the radio communication terminal 1207 has passed through the tunnel and become a communicable status, the communication before the suspension cannot be continued, and communication and application program must be started again from the initial status. Such problem frequently occurs when the terminal moves by subway where communicable and incommunicable sections repeatedly come alternately in a short period. However, in movement by subway, the period of movement is stable in comparison with movement by private car and on foot, and a period between entrance and exit of a tunnel can be easily predicted. By utilizing these factors, a period notification device 1205 which transmits period information on a period for a train to pass the tunnel (the period from a point where the train enters the tunnel and a point where the train goes out of the tunnel and enters a communicable status) by a weak radio wave is placed around the entrance of the tunnel. A radio communication terminal 1207 receives the period information and sends the period information to a mobile gateway in a center 1201 in radio data communication. The mobile gateway controls (delays) the communication time with the application server based on the period information, to prevent the application server from entering a communication nonrestorable status as in the case of conventional system.

SUMMARY OF THE INVENTION

The present invention has its object to provide a radio data communication system in which a mobile gateway continues communication with an application server in expectation that a radio communication terminal restores connection after elapse of incommunicable period.

According to one aspect of the present invention, in data communication utilizing a radio transmission channel, data communication processing can be continued on the center side even if data communication is interrupted due to disconnection of radio channel, by obtaining a period where data is interrupted in advance. More specifically, in a situation where a radio communication terminal moves through a radio data communicable section (station or the like) and a radio data incommunicable section (tunnel or the like) alternately as in subway transportation and a period to pass the radio data incommunicable section can be predicted with a certain level of precision, a device to transmit information on a period necessary for passing the tunnel or the like is placed in front of the tunnel, then the mobile gateway of the present invention reduces the communication speed, and performs communication with an application server on the center side taking the place of the radio communication terminal (client) in correspondence with the period. Thus the communication between the application server and the client application program can be continuously performed without time-out in the application server on the center side.

That is, provided is a radio data communication system comprising: an application server provided in a center; a plurality of radio communication terminals each performs data communication with the application server by utilizing a radio communication channel while moving; means for providing predicted disconnection period information, on radio channel disconnection caused when the radio communication terminal moves to a specific position; delayed communication means for, when it is predicted that the radio communication terminal moves to the specific position, performing communication processing taking the place of the radio communication terminal for a period indicated by the disconnection period information, responding to the application server, storing processed communication content, and when the period indicated by the disconnection period information has elapsed, transmitting the stored communication content to the radio communication terminal.

It is preferable that the delayed communication means has means for reducing the speed of communication with the application server when the delayed communication means performs the communication processing taking the place of the radio communication terminal and when it transmits the stored communication content to the radio communication terminal. In this case, it is preferable that the delayed communication means has means for determining a period where the speed of communication with the application server is reduced, based on the period indicated by the disconnection period information and a period necessary to transmit all the stored communication content to the radio communication terminal. Otherwise, it may be arranged such that the delayed communication means has means for determining a period where the speed of communication with the application server is reduced by always monitoring the remaining amount of stored communication content.

It is preferable that the delayed communication means has means for monitoring the content of communication between the application server and the radio communication terminal and recognizing the type of application program used in the communication, and means for selecting a communication response in correspondence with the recognized application program.

The delayed communication means is realized as a function of the mobile gateway to connect a network to provide a radio circuit communication channel to the radio communication terminal in the center with the application server.

The means for providing the disconnection period information includes means for transmitting the disconnection period information, by a radio wave receivable for the radio communication terminal, around a position where the radio communication channel is disconnected. The radio communication terminal includes means for notifying the center side of received disconnection period information. Further, the delayed communication means includes means for extracting the disconnection period information from the notification means. In this case, the radio communication terminal includes means for suspending data communication with the application server in accordance with notification of disconnection period information to the center side. Further, the radio communication terminal has a timer for restoring the data communication when a period indicated by the disconnection period information has elapsed, or the radio communication terminal has means for monitoring the intensity of radio wave from a base station and restoring the data communication.

Further, it may be arranged such that the means for providing the disconnection period information has means for detecting an identifier unique to the radio communication terminal, sent by the terminal, around a potion where the radio communication channel is disconnected, and means for notifying the delayed communication means of the detected identifier and the disconnection period information. The identifier may be detected by the means for providing the disconnection period information from a signal used by the radio terminal device for communication, or may be detected as a response to connection period information.

That is, it may be arranged such that the means for providing the disconnection period information includes means for transmitting the disconnection period information by a radio wave receivable for the radio communication terminal, and wherein the radio communication terminal includes means for returning an identifier of the radio communication terminal when the disconnection period information has been received. In this case, it may be arranged such that the radio communication terminal includes means for suspending data communication with the application server in accordance with return of the identifier of the radio communication terminal. It may be arranged such that the radio communication terminal has a timer for restoring the data communication when a period indicated by the disconnection period information has elapsed, or the radio communication terminal has means for monitoring the intensity of radio wave from a base station and restoring the data communication.

It may be arranged such that the radio communication terminal includes means for detecting a position of the radio communication terminal and means for notifying the center side of the detected positional information. Further, the means for providing the disconnection period information includes memory means in which position where radio communication channel disconnection is predicted and its disconnection period information are stored. Further, the delayed communication means includes means for extracting the positional information notified from the radio communication terminal and means for searching the memory means to obtain corresponding disconnection period information based on the extracted positional information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
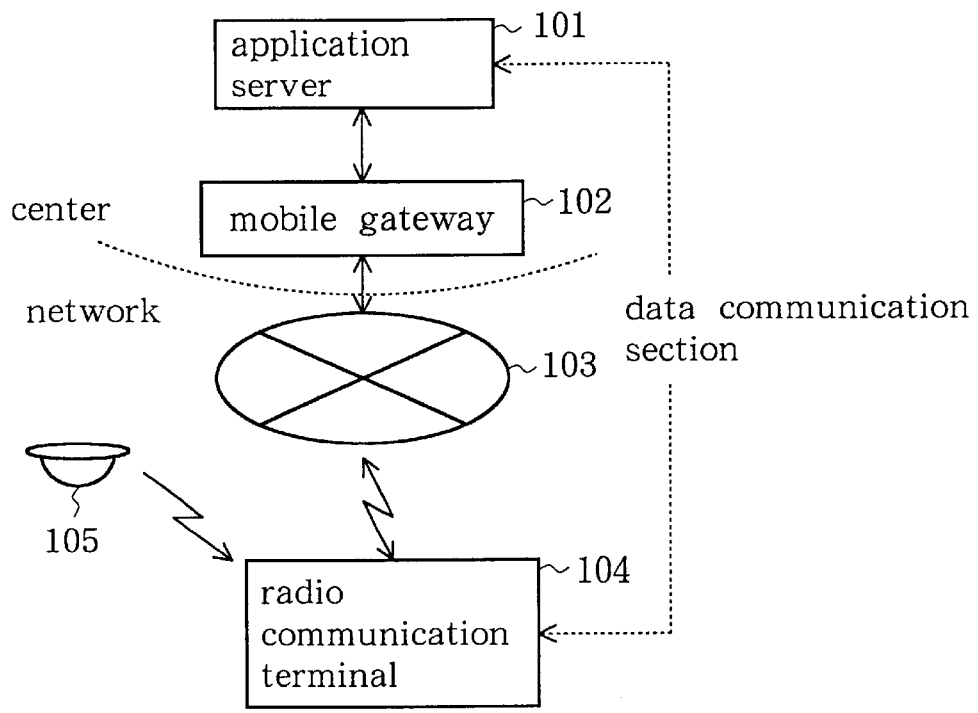
FIG. 1 is a block diagram showing the basic construction of a radio data communication system of the present invention.
Figure 2:
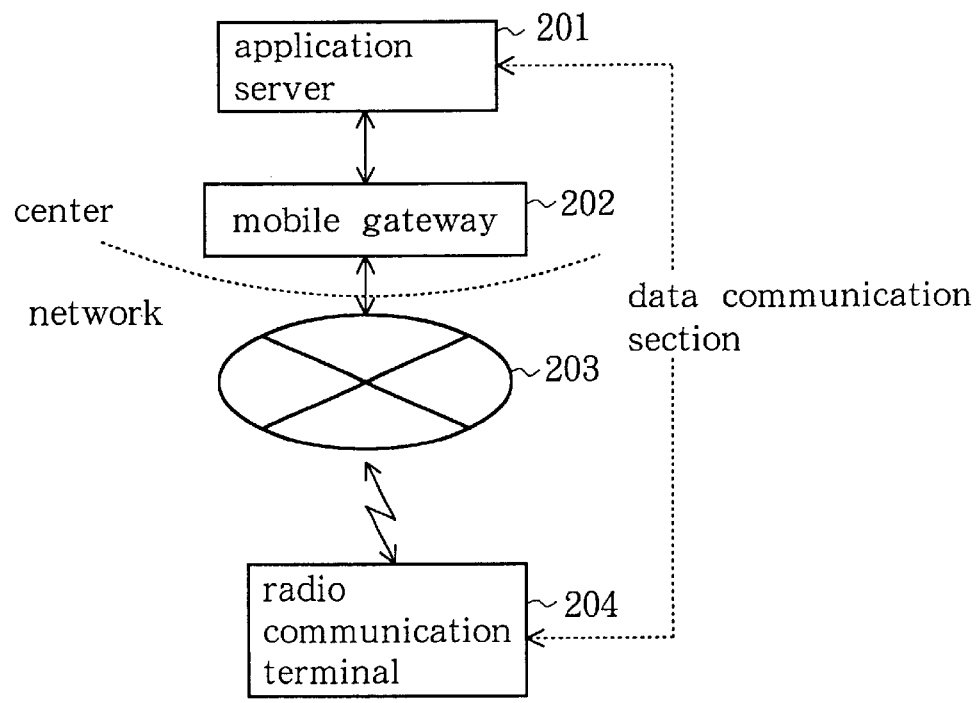
FIG. 2 is a block diagram showing the basic construction of the conventional radio data communication system.

FIG. 1 shows a radio data communication system as an embodiment of the present invention. In FIG. 1, a period notification device 105, having a radiounit which transmits period information by utilizing a weak radio wave, transmits period information pre-stored inside at predetermined intervals. A radio communication terminal 104, having an information processor, a radio unit and a timer (See FIG. 3), sends data handled by the information processor, on a radio transmission channel via the radio unit, to an application server 101. Further, the radio communication terminal 104 handles data sent from the application server 101 through the radio transmission channel via the radio unit, by the information processor. Further, even in data communication as described above, when the radio communication terminal 104 receives period information from the period notification device 105, the radio communication terminal 104 transmits the period information as in the above-described data communication. A network 103 is an existing radio communication network. Also, a dial-up router (See FIG. 3) is an existing router. In this embodiment, the network 103 and the dial-up router are used simply as a radio transmission channel. The dial-up router performs signal conversion necessary for connection with a LAN (Local Area Network) via the network line. When digital data is transmitted utilizing a radio transmission channel as in the present invention, the above-described PIAFS (PHS Internet Access Forum Standard) may be used. The network 103 includes an exchange for connection between the radio communication terminal 104 and the center, and a base station for radio communication with the radio communication terminal 104. The exchange and the base station are already well known, therefore, explanations of the base station and exchange will be omitted. The mobile gateway 102 has a data input/output unit A, a data input/output unit B, a header monitor, a buffer, an input/output controller, and a timer (See FIG. 3). The mobile gateway 102 usually relays data communication between the application server 101 and the radio communication terminal 104. When the mobile gateway 102 receives the above-described period information from the radio communication terminal 104, the mobile gateway 102 reduces the speed of communication with the application server 101. Then, when a period corresponding to the period information has elapsed, the mobile gateway 102 sends data stored in the buffer to the radio communication terminal 104, to restore the initial speed of communication with the application server 101.

Figure 3:
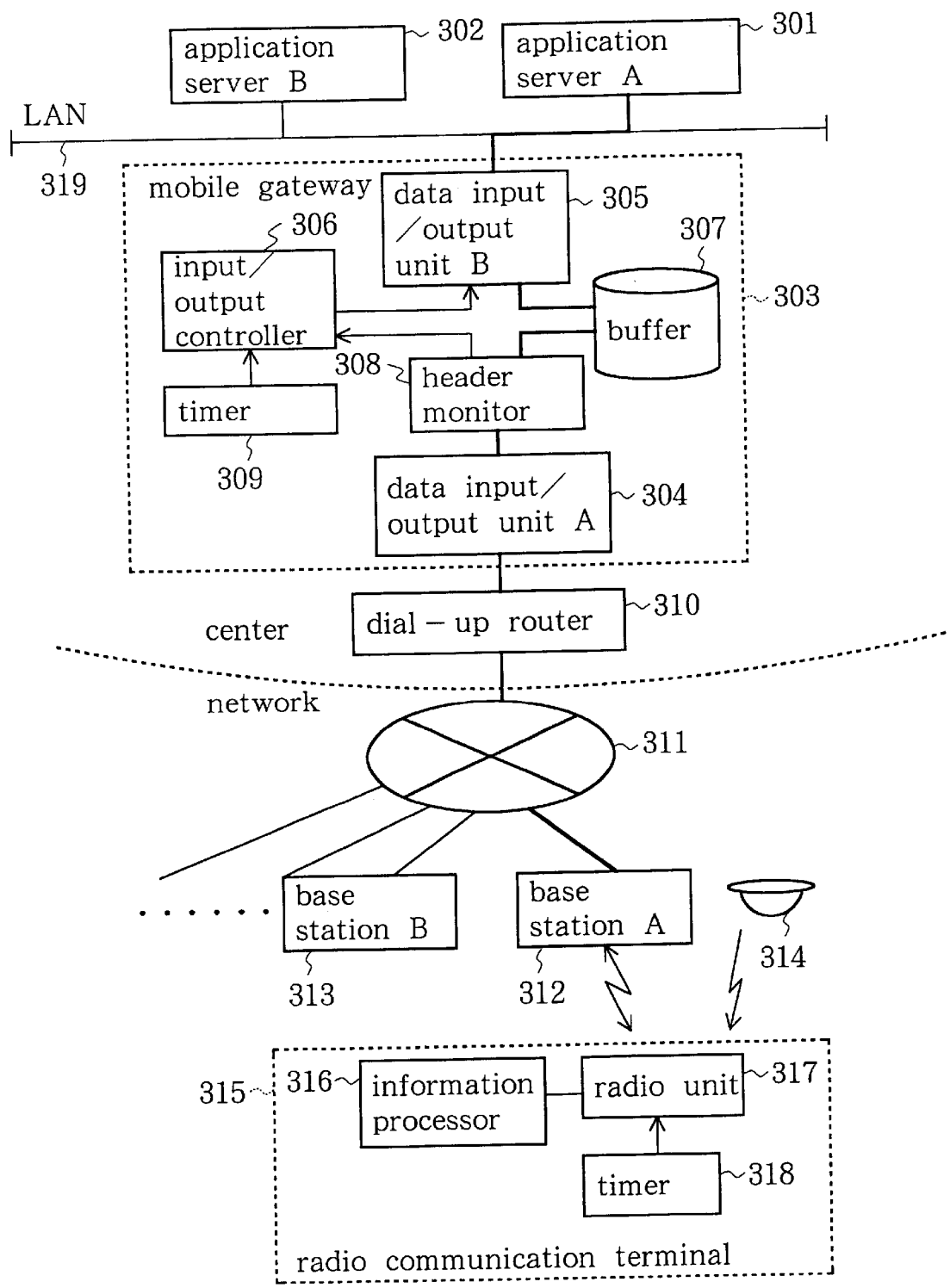
FIG. 3 is a block diagram showing the detailed construction of the radio data communication system of the present invention.

FIG. 3 shows the detailed construction of the radio data communication system in FIG. 1. A mobile gateway 303 has a data input/output unit A304 provided on the network side, for data input/output processing with respect to a radio communication terminal 315, and a data input/output unit B305 provided on the LAN 319 side, for data input/output processing with respect to an application server 301. A buffer 307 is provided as a storage area for buffering a difference, if occurs, between the communication speed of the data input/output unit A304 and that of the data input/output unit B305. The mobile gateway 303 has a header monitor 308 which writes data received from a radio communication terminal 315 into the buffer 307 and monitors whether or not the period information T is included in the data, in normal times. When the period information T is included in the data, the header monitor 308 forwards the period information T to an input/output controller 306. The mobile gateway 303 has at least the input/output controller 306 which controls the communication speed of the data input/output unit B305, and a timer 309 which notifies that a period S set by the input/output controller 306 has elapsed, to the input/output controller 306.

When the input/output controller 306 receives the period information T from the header monitor 308, the input/output controller 306 starts its operation. The input/output controller 306 stores time of reception of the period information T as time of disconnection of communication between the radio communication terminal 315 and a network 311. Further, the input/output controller 306 sends a signal designating a communication speed to the data input/output unit B305. Further, the input/output controller 306 sends the signal designating the communication speed to the data input/output unit B305, after the elapse of the time indicated by the period information+the period S from the time of the reception of the period information T from the header monitor 308.

The data input/output unit B305 communicates with the application server 301/302 by utilizing a network such as the LAN 319. The data input/output unit B305 performs communication with the application server 301 in packet units, stores a packet received from the application server 301 into the buffer 307. If there is a packet to be forwarded to the application server 301 in the buffer 307, the input/output unit B305 transmits the packet to the application server 301. When the data input/output unit B305 receives a signal designating a communication speed from the input/output controller 306, the data input/output unit B305 changes the speed of communication with the application server 301 in accordance with the signal. The data input/output unit B305 changes the communication speed in data packet units. The data input/output unit B305 reduces the communication speed by delaying transmission interval between packet-reception completion notification packets (ACK packets). Further, if the signal from the input/output controller 306 instructs to restore the initial communication speed, the data input/output unit B305 transmits the ACK packets at intervals without delay.

The data input/output unit A304 performs communication with the radio communication terminal 315 connected to the radio public channel network (network) 311 through connection via the dial-up router 310 or the like. The data input/output unit A304 also performs communication with the radio communication terminal 315 in packet units. The data input/output unit A304 stores a packet received from the radio communication terminal 315 into the buffer 307, and if there is a packet to be forwarded to the radio communication terminal 315 in the buffer 307, transmits the packet to the radio communication terminal 315. Further, during data communication, if connection in a radio communication section of the radio public channel network is disconnected, the data input/output unit A304 immediately terminates the communication with the radio communication terminal 315.

Next, the period S will be described. The period S is a period from a point where the input/output controller 306 receives the period information from the header monitor 308, to a point where the input/output controller 306 transmits a signal instructing to change the communication speed, including instruction to restore the communication speed, to the data input/output unit B305. That is, when the input/output controller 306 receives the period information, it transmits the signal instructing to change the communication speed, including instruction to restore the communication speed, to the data input/output unit B305, after elapse of the period S.

Figure 4:
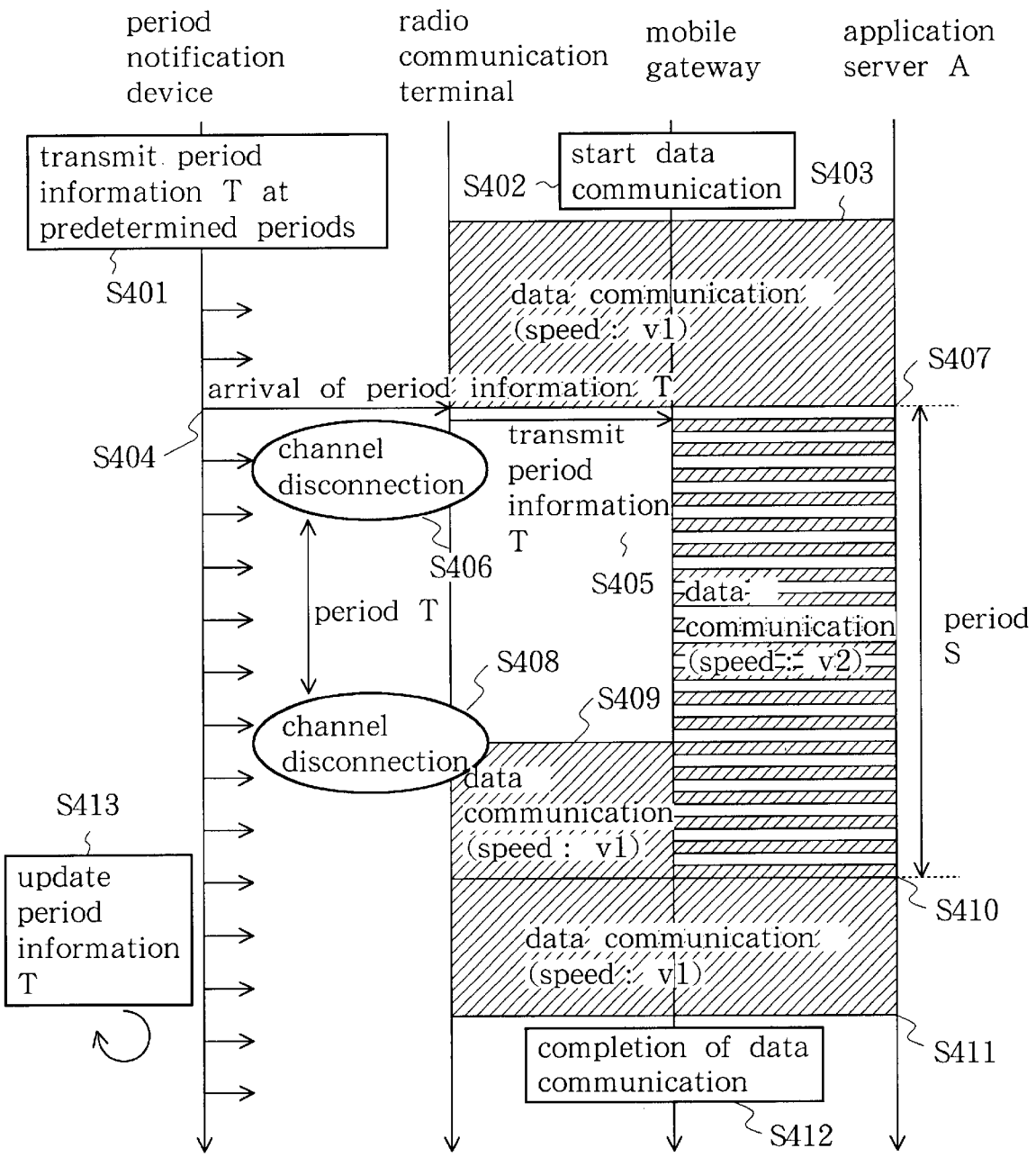
FIG. 4 is a timing chart showing the basic sequence of operation of the radio data communication system of the present invention.

Referring to FIG. 4, it is understood that the period S is defined as follows. Assume that in the present embodiment, T is period information forwarded from the header monitor 308 to the input/output controller 306, and the period information T corresponds to a period where communication is interrupted upon temporary blackout in communication between the data input/output unit A304 and the radio communication terminal 315. Assume that the speed of communication between the data input/output unit A304 and the radio communication terminal 315 is v1, and that between the data input/output unit B305 and the application server 301 when communication is smoothly performed between the data input/output unit A304 and the radio communication terminal 315 is also v1. Further, assume that the speed of communication between the data input/output unit B305 and the application server 301 when temporary communication blackout occurs between the data input/output unit A304 and the radio communication terminal 315 is v2. Under the above conditions, as v1×(S−T)=S×v2 holds, as the period S, S=T×v1/(v1−v2) holds. If v1 and v2 are constants, S can be expressed by linear expression of T. Note that v1 and v2 are constants determined in correspondence with the types of application server 301/302 and application programs. The input/output controller 306 has these values as table information in advance, for types of the application server 301/302 and application programs. The table information is referred to as a v2 table.

The above-described packet holds a series of continuous communication data having an arbitrary amount of data and a header including information on the data, data destination information (address) and origination information (address), arrayed in time sequential manner. The mobile gateway 303 operates in accordance with a packet as a communication minimum unit.

Figure 12:
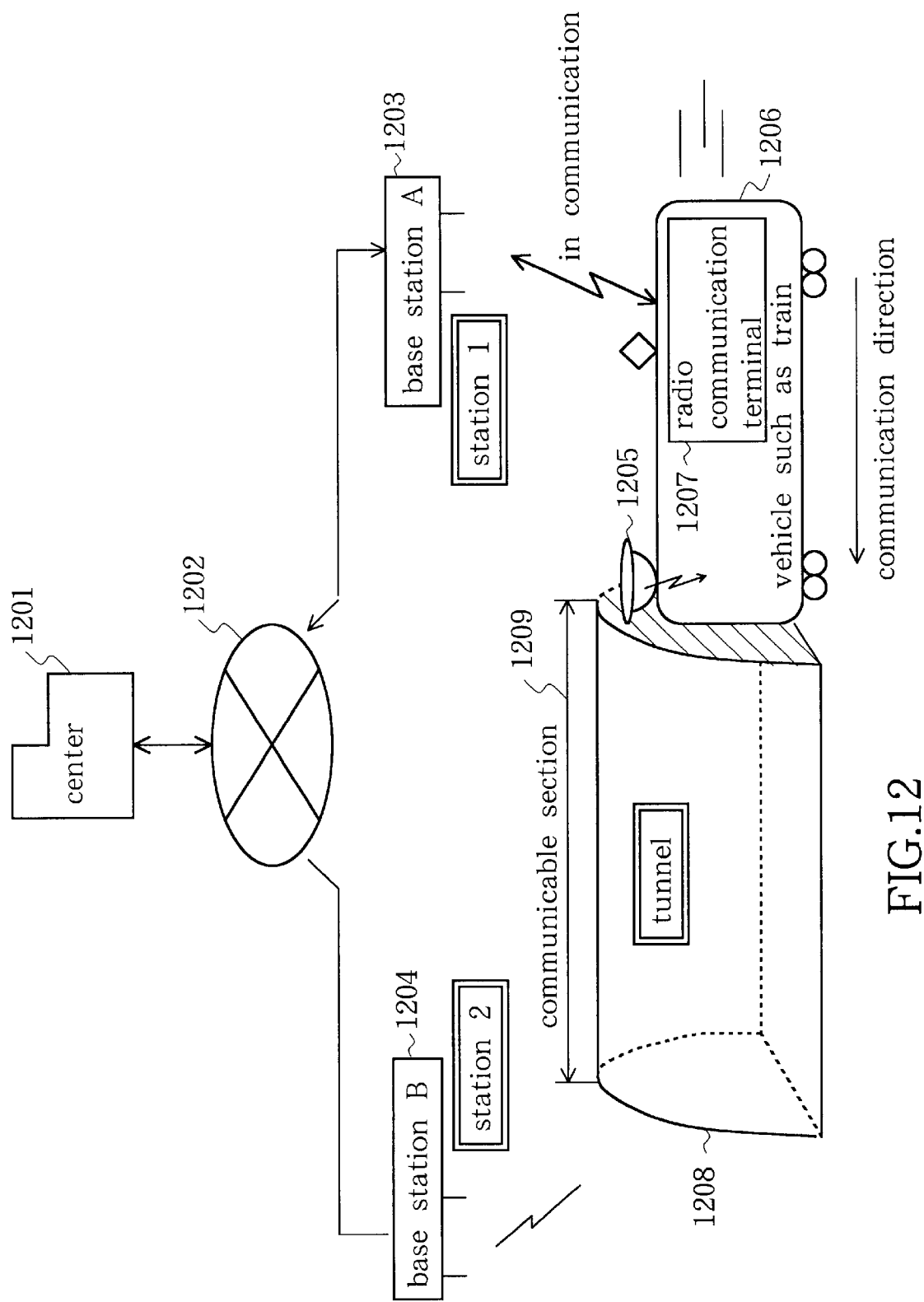
FIG. 12 is a block diagram showing an example of setting of the radio data communication system of the present invention.

It is assumed that period notification device 314 is placed as shown in FIG. 12. In FIG. 12, a period notification device 1205 continuously transmits the period information T necessary for passing a coming incommunicable section 1209 by a weak radio wave. The incommunicable section 1209 means a section from a point where communication with a base station A1203 is interrupted, to a point where communication with a base station B1204 becomes possible. The weak radio wave is transmitted by a specific power-thrifty radio unit, and the radio wave is sent in the range of about 5 meters. Accordingly, only when the radio communication terminal 1207 passes near the period notification device 1205, the radio communication terminal 1207 receives the period information T from the period notification device 1205.

The radio communication terminal 315 has an information processor 316, a radio unit 317 and a timer 318. In normal times, the radio communication terminal 315 performs arbitrary data communication with the application server 301/302 on the center side by utilizing the radio public channel network 311. When the radio communication terminal 315 receives the period information T from the period notification device 314, the terminal 315 suspends data communication with the application server 301/302, and transmits the period information T to the center side.

In normal times, the header monitor 308 passes data communication between the radio communication terminal 315 and the application server 301, monitoring a packet including the period information T passing there. The header monitor 308 cuts the period information T out of the packet, and forwards the period information T to the input/output controller 306.

The detailed construction of the present embodiment is as described above The dial-up router 310, the network (radio public channel network) 311, the base station 312/313 and the application server 301/302 are well known to those skilled in the art, and conventional devices are applicable to these constituents of the present embodiment. Further, these constituents are not directly related to the present invention, therefore, explanations of detailed constructions of these constituents will be omitted. Further, the application server may be a single device or a plurality of servers may be provided.

Next, the operation of the radio data communication system will be described with reference to the timing chart of FIG. 4. It is assumed that the radio data communication system in FIG. 3 is installed in a situation as shown in FIG. 12. Note that FIG. 12 shows a situation where radio data communication is performed in a subway station or the like, and the radio data communication becomes impossible immediately after a radio communication terminal enters a tunnel. Further, in FIG. 12, the period notification device 1205 is placed around the entrance of a tunnel 1208. The radio communication terminal 1207 on a mobile unit (vehicle such as a train) 1206 receives period information from the period notification device 1205 immediately before it enters the tunnel 1208.

In FIG. 4, the period notification device 314 transmits the period information T at predetermined periods (step S401). In this example, the predetermined periods correspond to 1-second intervals. The value of the period information T is 15 seconds. As described above, the radio communication terminal 315 has been instructed from a user on the moving subway train to perform data communication, and the radio communication terminal 315 is performing communication with an application server A301 on the center side smoothly while the mobile unit stops at a station or the like (step S403). The data communication speed v1 at this time is 29.2 kbps. Further, the application server A301 at this time uses ftp (file transfer protocol: an application program for file transfer). The application server A301 continuously transfers continuous data from the application server 301 to the radio communication terminal 315. As described above, while the radio communication terminal 315 performs communication on the moving vehicle (step S403), the radio communication terminal 315 gradually approaches the incommunicable section (tunnel). Around the tunnel entrance, the radio communication terminal 315 receives the period information T from the period notification device 314 (step S404). The radio communication terminal 315 that has received the period information T transmits the period information T to the center side prior to ftp communication (step S405). Then, soon radio wave does not received between the radio communication terminal 315 and the base station A312 due to the movement of the vehicle, then channel disconnection occurs (step S406). Then a communication blackout continues until the vehicle goes out of the tunnel and a radio wave is received from the next base station B313 (step S406), during which the radio communication terminal 315 holds the midpoint status of the ftp communication.

In normal times, the mobile gateway 303 simply relays ftp communication, if smoothly performed between the radio communication terminal 315 and the application server A301. In the present embodiment, to "simply relay" means to receive data from the application server A301 taking the place of the radio communication terminal 315, and store the received content into the buffer 307 in the mobile gateway 303, and to read the content from the buffer and transmit it to the radio communication terminal 315 taking the place of the application server 301. At this time, in the mobile gateway 303, the data input/output unit A304 performs communication at the communication speed v1 allowable in the network 311. In the present embodiment, the communication speed v1 is 29.2 kbps as described above. Although the speed of communication between the data input/output unit B305 and the application server 301 is not necessary limited since the mobile gateway 303 has the buffer 307, the communication speed is the same as that of the communication speed v1 for convenience of explanation. In normal times, if the mobile gateway 303 does not relay communication, the allowable communication speed in the LAN 319 is often sufficiently higher than that in the radio network 311. At this time, the communication speed in the LAN 319 depends on the slower communication speed in the radio network 311. It is v1.

When the radio communication terminal 315 transmits the period information T to the center side, the period information T arrives at the mobile gateway 303 via the network 311 (step S405). The data input/output unit A304 in the mobile gateway 303 receives the period information T into the mobile gateway 303 as in the case of data communication packet.

In normal times, the header monitor 308 writes a data communication packet from the radio communication terminal 315 to the application server 301 into the buffer 307. The header monitor 308 always monitors a packet header passing therethrough. When the header monitor 308 detects a packet header including period information T (in the header, an identifier for discriminating that it includes period information T is described), the header monitor 308 decomposes the packet and reads the period information T. Next, the header monitor 308 sends the period information T to the input/output controller 306.

In normal data communication, the input/output controller 306 does not specially operate (step S403), and when it receives period information T from the header monitor 308, starts its operation. The input/output controller 306 that has received period information T instructs the data input/output unit B305 to reduce the speed of communication with the application server 301 (step S407). At this time, the communication speed to be designated is v2, which is 10 kbps in the present embodiment. The communication speed v2 is determined in accordance with the type of communication application program on the application server A301. Preferably, the speed is as slow as possible, to a level not to interrupt the communication by the application program (ftp in this embodiment). Further, it may be arranged such that the input/output controller 306 suspends communication with the application server 301/302 in stead of setting the communication speed of the data input/output unit B305 to v2, in accordance with the values of T and S. In this case, the input/output controller 306 does not perform an operation to restore the communication speed v1 from v2 to be described later. The communication is repeated from the start of communication (step S401). The determination to set the communication speed to v2 or to suspend the communication is described in the v2 table of the input/output controller 306.

A general communication application program determines that some trouble has occurred on the communication destination (the ftp program on the radio communication terminal 315 in this embodiment) if a response from the destination has not been received for a predetermined period, and suspends communication, to avoid unnecessary consumption of machine resource by the application server 301 in a status where the communication destination cannot perform communication any more. However, this arrangement is premised on a cable network such as a LAN, and a communication environment utilizing transmission channel including a radio channel such as the present embodiment is not considered.

Next, the input/output controller 306 sets the timer 309 with the period S. As described above, the period S is expressed by an equation using v1, v2 and T, $S=T\cdot v1/(v1-v2)$. As v1=29.2 kbps, v2=10.0 kbps, and T=15 seconds hold, $S\approx30.8$ seconds holds. If the timer 309 operates with precision of 1 second, the input/output controller 306 sets the timer 309 with 31 seconds as the period S. The timer 209 operates when the period S is set, and performs notification to the input/output controller 306 after elapse of the period S. By the notification, the input/output controller 306 recognizes that the period S has elapsed.

The radio communication terminal 315 and the moving vehicle go out of the tunnel after a period T, then enters a communicable section again. At this time, the timer 318 in the radio communication terminal 315 notifies the radio 317 that the period T has elapsed, and in response to the notification, radio channel connection (step S408) and communication resumption (step S409) are made. Then the radio communication terminal 315 resumes communication with the mobile gateway 303 (step S409). The radio communication terminal 315 may perform the radio channel connection (step S408) and communication resumption (step S409) by the user's operation without using the timer 318. At this time, the data input/output unit A304 of the mobile gateway 303 performs communication at the communication speed v1.

As described above, the content of the data in the buffer 307 stored by the data input/output unit B305 during the period T is sequentially sent by the data input/output unit A304 to the radio communication terminal 315. At this time, as the speed of communication between the data input/output unit B305 and the application server A301 is still v2, the data stored in the buffer gradually decreases. In an ideal communication status, when the period S has elapsed since the communication speed was set to v2, the content remaining in the buffer is 0 (step S410). In practice, as the communication speed is not fixed, time error in some degree may occur. The input/output controller 306, that has been informed by the timer 309 of the elapsed of the period S, instructs the data input/output unit B305 to restore the communication speed to v1. Thus, the data input/output units A305 and B304 both perform communication at the communication speed v1 as in normal data communication.

In the present embodiment in FIG. 3, the ftp communication is completed (step S411), and the communication is terminated (step S412).

If the vehicle enters the next tunnel before the communication is completed, the radio communication terminal 315 is notified of period information T (this value T is time necessary for passing the next tunnel and is not 15 second as the value of the previous T) by the next period notification device 314, and repeats the above operations (steps S404 and S410). Further, when a predetermined period has elapsed, the period notification device 314 refers to its internal table or the like prepared in advance, to update the period information T (step S413), in correspondence with the change in tunnel passing period of the moving vehicle.

Figure 5:
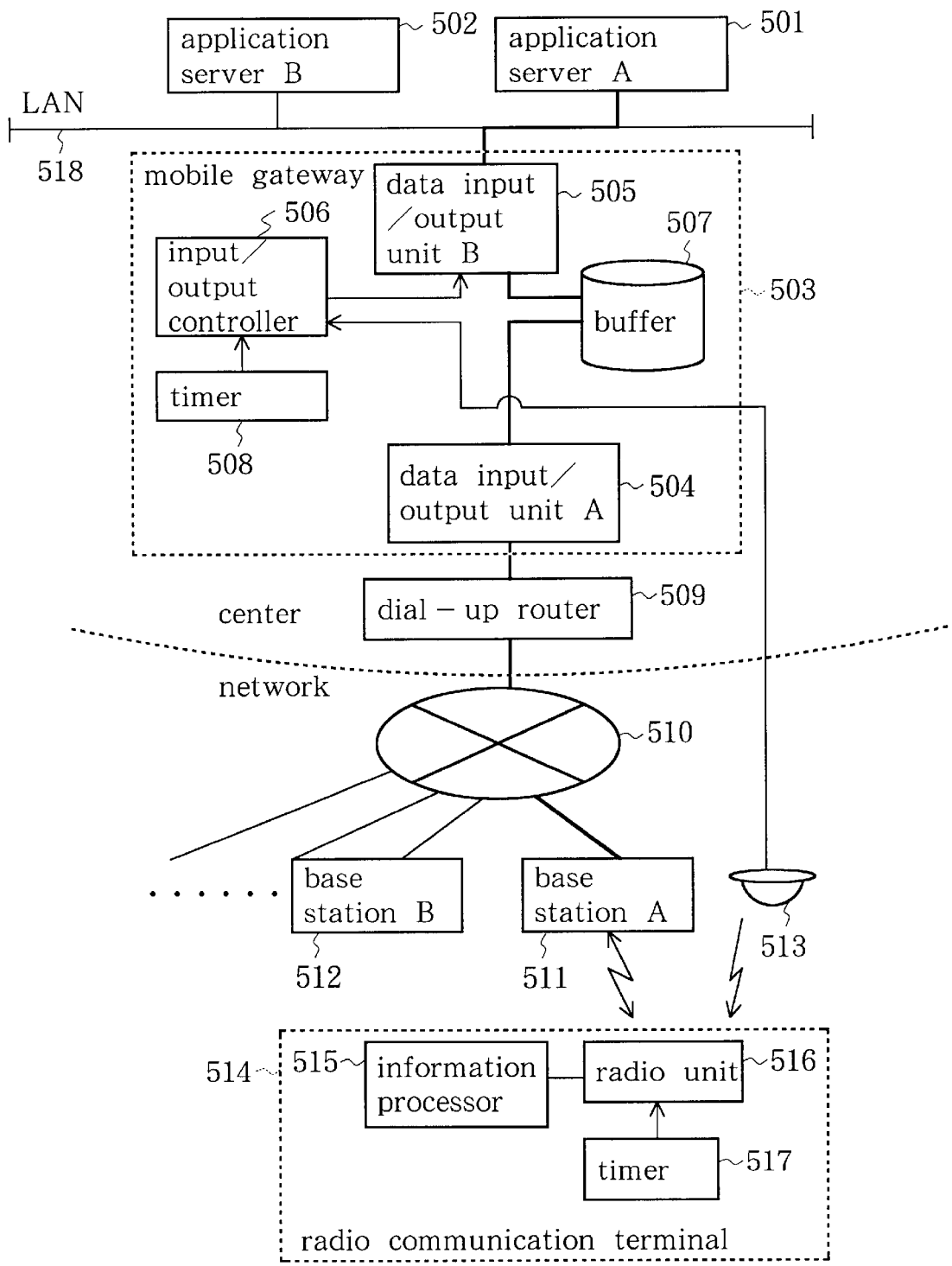
FIG. 5 is a block diagram showing the detailed construction of the radio data communication system according to a second embodiment of the present invention.
Figure 6:
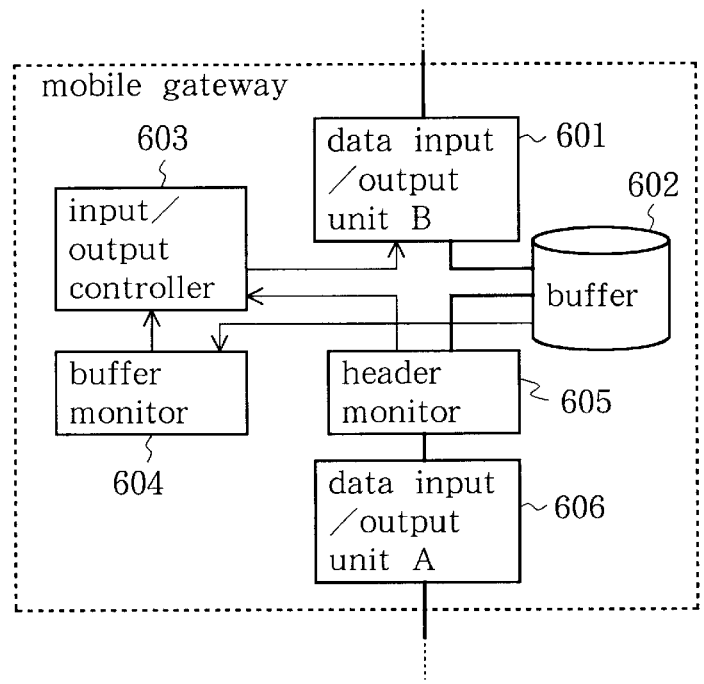
FIG. 6 is a block diagram showing the construction of a mobile gateway according to a third embodiment of the present invention.
Figure 7:
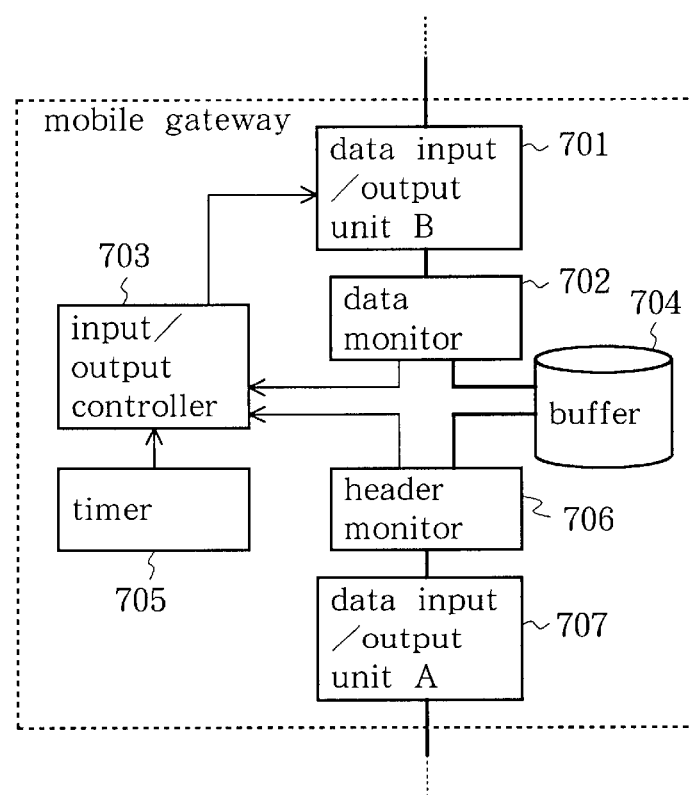
FIG. 7 is a block diagram showing the construction of the mobile gateway according to a fourth embodiment of the present invention.
Figure 8:
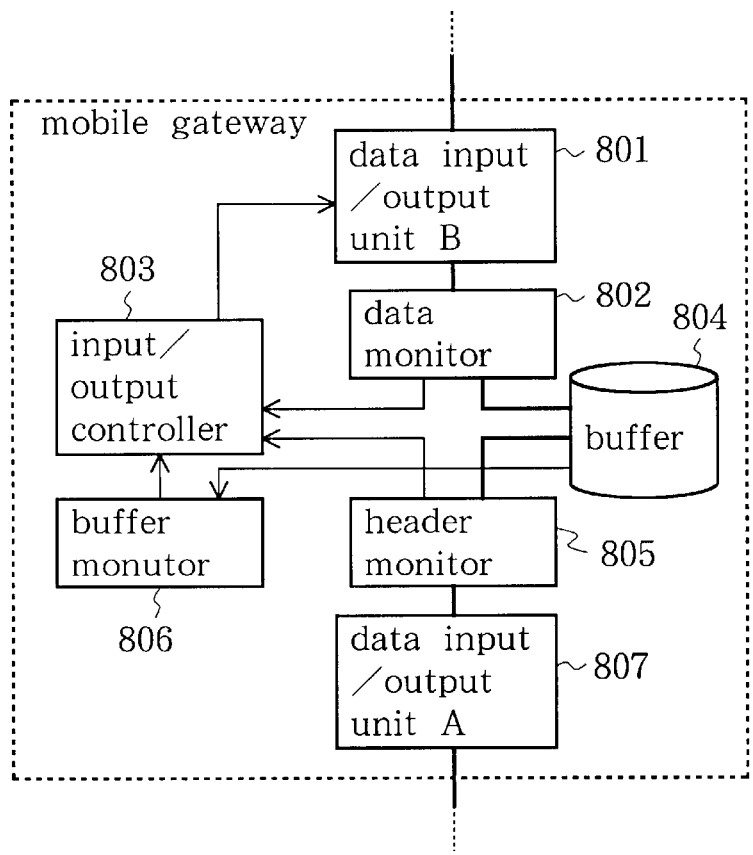
FIG. 8 is a block diagram showing the construction of the mobile gateway according to a fifth embodiment of the present invention.

FIG. 5 shows the construction of a second embodiment of the present invention. The basic construction of the second embodiment is the same as the above-described embodiment, however, the method of period information notification by the period notification device is different from that in the previous embodiment. In the radio data communication system in FIG. 5, a period notification device 513 is directly connected to an input/output controller 506. The period notification device 513 notifies the input/output controller 506 of an identifier of a radio communication terminal 514 which has passed around the period notification device 513 and a time period necessary for the radio communication terminal 514 to pass an incommunicable section. Upon reception of period information T from the period notification device 513, the radio communication terminal 514 returns its identifier to the period notification device 513. The identifier is uniquely allotted to each radio communication terminal. This arrangement realizes a radio data communication system having the function of the first embodiment, where the header monitor 308 in the mobile gateway 303 is unnecessary, and further, the radio communication terminal 315 that received the period information T from the period notification device 314 has a function to change the communication speed of the data input/output unit B305 without transmitting the period information T to the center side. FIGS. 6 to 8 show constructions of third to fifth embodiments of the present invention. In each of the third to fifth embodiments, the basic construction is the same as that as described in the first embodiment, however, the mobile gateway is different from that of the first embodiment. The mobile gateway of the third embodiment as shown in FIG. 6 has a buffer monitor 604 taking the place of the timer 309. The buffer monitor 604 always monitors a buffer 602. In this arrangement, the same function as that of the first embodiment can be realized by detecting that the amount of residual data stored in the buffer 602 has become 0, in restored data communication after the communication speed of a data input/output unit B601 was once reduced and radio communication channel was connected again, and at that time, notifying the input/output controller 603 that the amount of residual data has become 0.

The mobile gateway of the fourth embodiment as shown in FIG. 7 has a data monitor 702. The data monitor 702 always monitors the content of data communication, recognizes the type and situation of data communication, and notifies an input/output controller 703 of an appropriate communication speed v2. In this arrangement, the input/output controller 703 is informed of in-communication server of the application servers 301 and 302 and the type of currently-used application program, and obtains a key item to refer to the v2 table of the first embodiment.

FIG. 8 shows the mobile gateway of the fifth embodiment. In FIG. 8, the mobile gateway has a buffer monitor 806 taking the place of the timer, and a data monitor, to realize the functions of the third and fourth embodiments.

Figure 9:
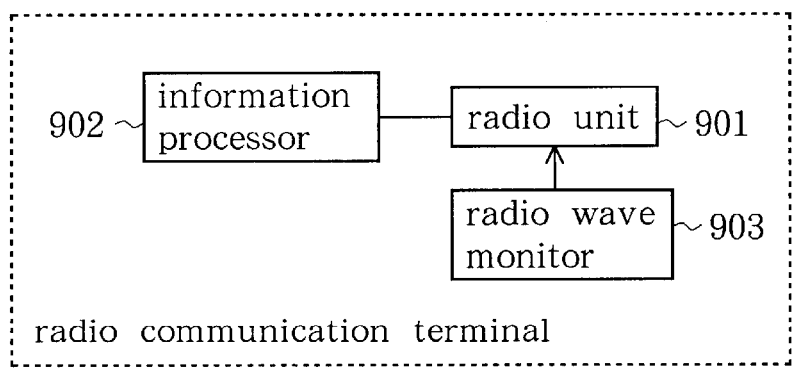
FIG. 9 is a block diagram showing the construction of a radio communication terminal according to a sixth embodiment of the present invention.
Figure 10:
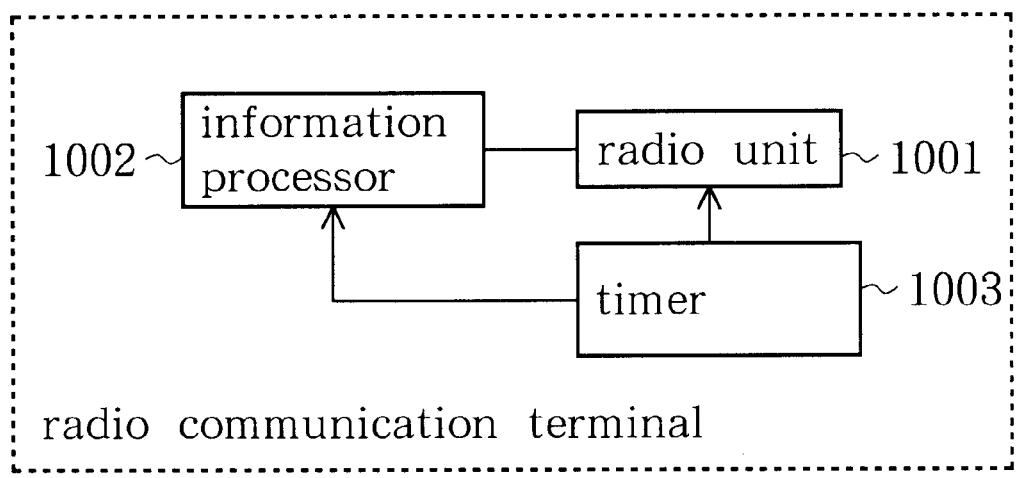
FIG. 10 is a block diagram showing the construction of a radio communication terminal according to a seventh embodiment of the present invention.
Figure 11:
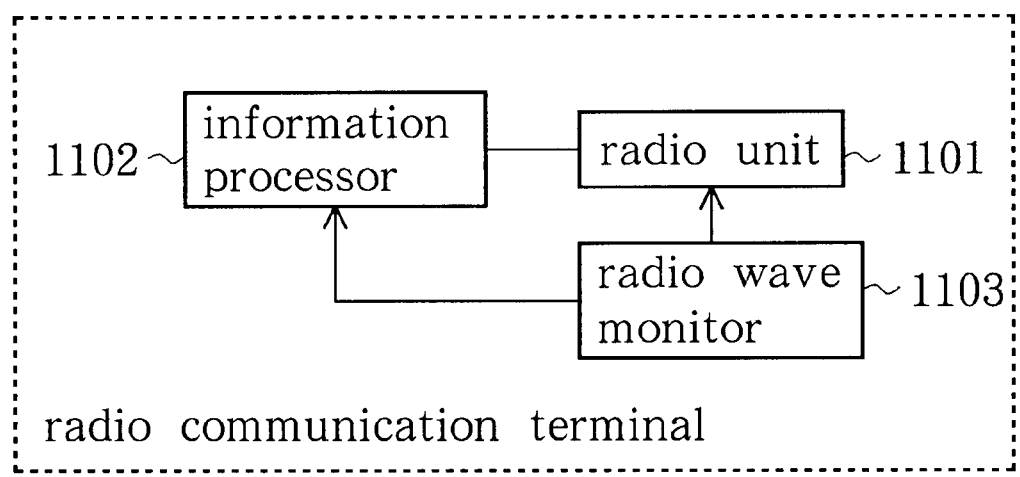
FIG. 11 is a block diagram showing the construction of a radio communication terminal according to an eighth embodiment of the present invention.

Further, FIGS. 9 to 11 show sixth to eighth embodiment of the present invention. In each of the sixth to eighth embodiments, the basic construction is the same as that as described in the first embodiment, however, the radio communication terminal is different from that of the first embodiment. FIG. 9 shows the radio communication terminal of the sixth embodiment. In FIG. 9, a radio wave monitor 903 monitors the intensity of a radio wave from a base station B512, and notifies a radio unit 901 that a radio wave having a sufficient intensity has been obtained for channel connection. The radio unit 901 restores the channel connection. In this arrangement, a radio communication terminal which performs optimum channel connection for radio wave condition is realized.

FIG. 10 shows the radio communication terminal of the seventh embodiment. In FIG. 10, a timer 1003 is set to a period T, and after the elapse of the period T, a radio unit 1001 and an information processor 1002 are notified of the elapse of the period T. The radio unit 1001 restores the channel connection, and the information processor 1002 restores data communication.

FIG. 11 shows the radio communication terminal of the eighth embodiment. In FIG. 11, a radio wave monitor 1103 monitors the intensity of a radio wave from the base station B512, and notifies a radio unit 1101 and an information processor 1102 that a radio wave having a sufficient intensity has been obtained for channel connection. The radio unit 1101 restores the channel connection, and the information processor 1102 restores data communication.

Figure 13:
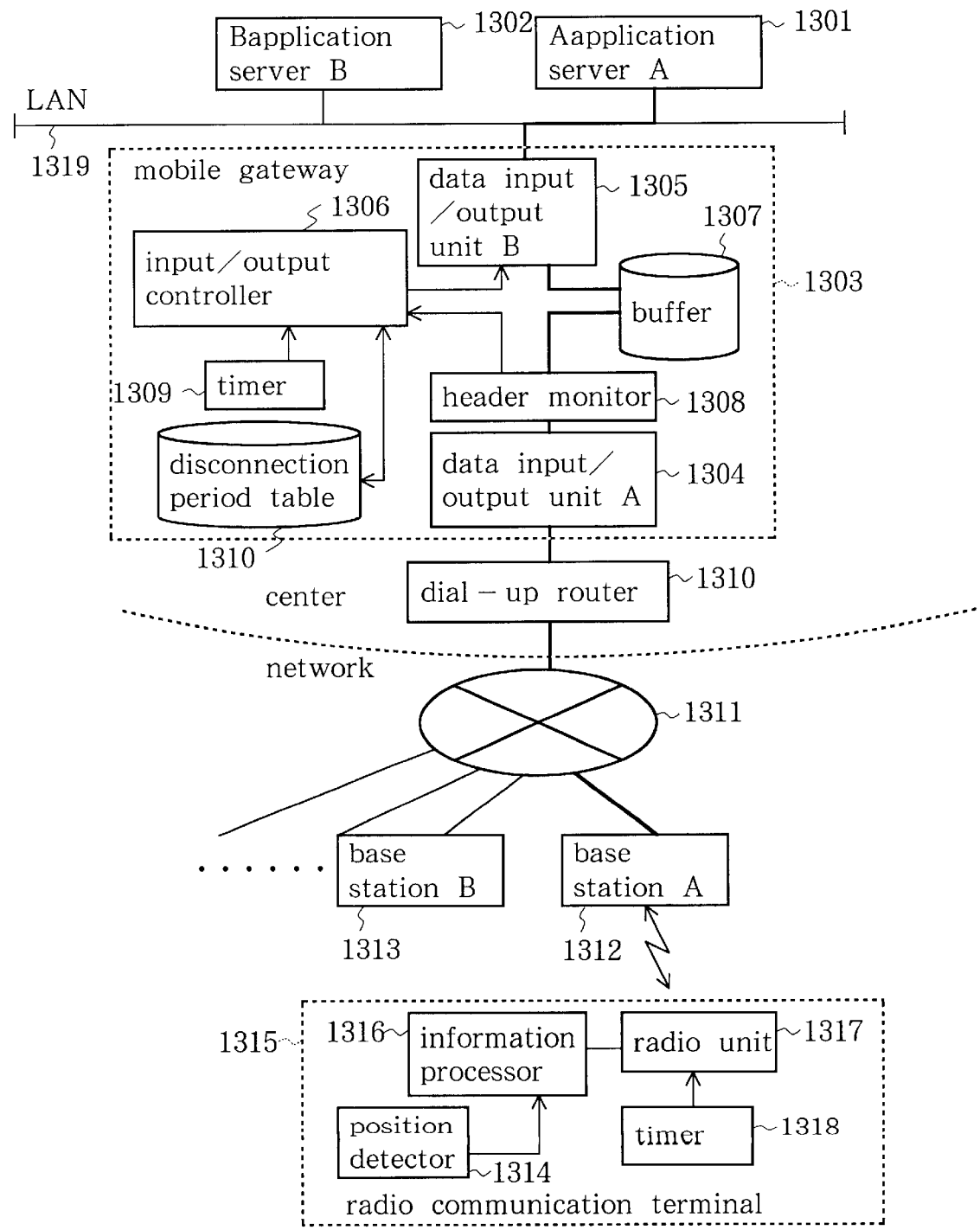
FIG. 13 is a block diagram showing the construction of the radio data communication system according to a ninth embodiment.

FIG. 13 shows a radio data communication system of a ninth embodiment. In FIG. 13, a radio communication terminal 1315 has means for detecting geographic positional information of a radio communication terminal. To detect the positional information, various means such as utilization of satellite, utilization of gyrocompass, and utilization of identifier unique to a base station in communication, are known. In the present embodiment, the method of the means for detecting the positional information is not limited. Further, in the radio data communication system in FIG. 13, a mobile gateway 1303 has a table 1320 to which predictable channel-disconnection period information can be referred based on the geographic positional information (this table is referred to as a "disconnection period table"). The table 1320 is referred to by an input/output controller 1306. Further, when positional information passes as communication data through a header monitor 1308, the header monitor 1308 extracts the positional information from the data, and notifies the input/output controller 1306 of the positional information. If the radio communication terminal 1315 is performing communication at this time, it detects its positional information always at fixed interval (e.g., 5 second intervals) and transmits the positional information to the center side during an interim in the data communication. The header monitor 1308 in the mobile gateway detects the positional information and forwards the information to the input/output controller 1306. The input/output controller 1306 refers to the disconnection period table 1320 based on the positional information, to examine whether or not the radio communication terminal 1315 is in a status where a communication blackout occurs. The above operations are repeated, and when the input/output controller 1306 determines that the radio communication terminal 1315 enters a status where a channel disconnection occurs, the input/output controller 1306 refers to period information T obtained from the disconnection period table, and as in the case of the first embodiment, sends a signal instructing to reduce the communication speed to a data input unit B1305, to reduce the speed of communication between the radio communication terminal 1315 and an application server A1301 to v2. The operation thereafter and the method for calculating the period S and the like are the same as those of the first embodiment.

As described above, the present invention has advantages as follows. As a first advantage, in a case where a moving radio communication terminal becomes incommunicable for a predetermined period, the radio communication terminal notifies the center side of the incommunicable period prior to disconnection, so that on the center side, a mobile gateway which relays communication controls the speed of communication with an application server in accordance with the incommunicable period. As a second advantage, in a case where a moving radio communication terminal becomes incommunicable for a predetermined period, a mobile gateway which relays communication on the center side controls the speed of communication with an application server in accordance with the incommunicable period, so that the application server can continuously perform communication without awareness of incommunicable status of the radio communication terminal. As a third advantage, in a case where a moving radio communication terminal becomes incommunicable for a predetermined period, the radio communication terminal which recognizes the incommunicable period prior to disconnection can start communication processing when the radio communication terminal enters a communicable status. As a fourth advantage, in a case where a moving radio communication terminal becomes incommunicable for a predetermined period, the radio communication terminal starts communication processing when the radio communication terminal enters a communicable status, which eliminates the necessity for the radio communication terminal to always monitor communicable status by examining radio wave condition or the like. As a fifth advantage, in a case where a moving radio communication terminal becomes incommunicable for a predetermined period, the radio communication terminal starts communication processing when the radio communication terminal enters a communicable status, so that the radio communication terminal can save electric consumption when it is in the incommunicable status. As a sixth advantage, in a case where a moving radio communication terminal becomes incommunicable for a predetermined period, a mobile gateway continues communication with an application server at a reduced communication speed, which eliminates the necessity for the application server to perform checking communication when the communication destination does not respond, thus suppressing increment in communication traffic on the center side network.

As many apparently widely different embodiments of the present invention can be made without departing from the spirit and scope thereof, it is to be understood that the invention is not limited to the specific embodiments thereof except as defined in the appended claims.

What is claimed is:

1. A radio data communication system comprising:
 an application server;
 a radio communication terminal performing data communication with said application server through a radio communication channel while moving;
 means for informing the radio communication terminal of a predicted disconnection period when the radio communication terminal moves to a location in the vicinity of the means for informing; and
 delayed communication means for performing communication processing in place of data communication between the radio communication terminal and the application server for a period determined based on the predicted disconnection period when the radio communication terminal is informed of said predicted disconnection period, said communication processing comprising:
  responding to communications sent from the application server to the radio communication terminal,
  storing communication content transmitted by the application server to the radio communication terminal, and
  when the period determined based on the predicted disconnection period has elapsed, transmitting the stored communication content to the radio communication terminal.

2. The radio data communication system according to claim 1, wherein the delayed communication means reduces a speed of communication with the application server when performing said communication processing and when transmitting said stored communication content to said radio communication terminal.

3. The radio data communication system according to claim 1, wherein the delayed communication means determines a period in which the speed of communication with said application server is reduced based on the predicted disconnection period and a period necessary to transmit all the stored communication content to the radio communication terminal.

4. The radio data communication system according to claim 1, wherein the delayed communication means determines a period in which the speed of communication with the application server is reduced by monitoring a remaining amount of stored communication content.

5. The radio data communication system according to claim 1, wherein the delayed communication means monitors the content of communication between the application server and the radio communication terminal, recognizes a type of application program used in the application server for the communication, and responds to communication from the application server in accordance with the recognized application program.

6. The radio data communication system according to claim 1, wherein the delayed communication means is provided in a mobile gateway that connects the application server to a network providing a radio communication channel for said radio communication terminal.

7. The radio data communication system according to claim 6, wherein the radio communication terminal suspends data communication with the application server in response to being informed of said predicted disconnection period.

8. The radio data communication system according to claim 7, wherein the radio communication terminal has a timer for restoring data communication with the application server when the predicted disconnection period has elapsed.

9. The radio data communication system according to claim 7, wherein the radio communication terminal monitors the intensity of a radio wave from a base station and restores data communication with the application server in accordance with said intensity.

10. The radio data communication system according to claim 1, wherein the means for informing a radio communication terminal of a predicted disconnection period transmits a predicted disconnection period using a radio wave receivable by the radio communication terminal in the vicinity of the means for informing, wherein the radio communication terminal transmits data indicating that the radio communication terminal has been informed of a predicted disconnection period, and wherein the delayed communication means extracts a predicted disconnection period from data transmitted by said radio communication terminal.

11. The radio data communication system according to claim 1, wherein the means for informing a radio communication terminal of a predicted disconnection period detects an identifier unique to the radio communication terminal that is sent by the radio communication terminal when the radio communication terminal is in the vicinity of the means for informing, and wherein the means for informing notifies the delayed communication means of the detected identifier of the radio communication terminal and the disconnection period when the identifier is detected.

12. The radio data communication system according to claim 11, wherein the means for informing a radio communication terminal of a predicted disconnection period transmits the disconnection period using a radio wave receivable by the radio communication terminal when the radio communication terminal is in the vicinity of the means for informing, and wherein the radio communication terminal transmits an identifier of the radio communication terminal to the means for informing when informed of a predicted disconnection period.

13. The radio data communication system according to claim 12, wherein the radio communication terminal suspends data communication with the application server upon transmitting said identifier.

14. The radio data communication system according to claim 13, wherein the radio communication terminal has a timer for restoring data communication with the application server when the predicted disconnection period has elapsed.

15. The radio data communication system according to claim 13, wherein the radio communication terminal monitors the intensity of a radio wave from a base station and restores data communication with the application server in accordance with said intensity.

16. The radio data communication system according to claim 1, wherein the radio communication terminal detects a position of the radio communication terminal and sends notification to the application server of the detected position, wherein the means for informing the radio communication terminal of a predicted disconnection period stores a position where radio communication channel disconnection is predicted and an associated predicted disconnection period, and wherein the delayed communication means extracts position information sent by the radio communication terminal and obtains a predicted disconnection period corresponding to said position from the means for informing.

17. A radio data communication system comprising:

an application server;

a mobile terminal communicating with said application server through a radio communication channel;

a mobile gateway linking the application server to a network that provides the radio communication channel; and a notification device, provided at a location at which the presence of the mobile terminal indicates that communication between the mobile terminal and the application server will be interrupted for a predicted period, for notifying the mobile terminal of said predicted period when it is in the vicinity of said notification device, wherein, when the mobile terminal is notified of said predicted period by the notification device, the mobile gateway communicates with the application server in place of the mobile terminal for a period determined in accordance with said predicted period.

18. The radio data communication system claimed in claim 17, wherein the mobile gateway detects said predicted period in data transmitted by the mobile terminal after the mobile terminal is notified of said predicted period by the notification device.

19. The radio data communication system claimed in claim 17, wherein the mobile gateway is notified of said predicted period and an identifier of the mobile device by the notification device after the mobile terminal is notified of said predicted period by the notification device.

20. The radio data communication system claimed in claim 17, wherein the mobile gateway reduces a rate of communication with the application server during said period determined in accordance with said predicted period.

* * * * *